United States Patent [19]

Maher, III

[11] Patent Number: 5,040,138

[45] Date of Patent: Aug. 13, 1991

[54] CIRCUIT FOR SIMULTANEOUS ARITHMETIC CALCULATION AND NORMALIZATION ESTIMATION

[75] Inventor: Robert D. Maher, III, Carrollton, Tex.

[73] Assignee: Cyrix Corporation, Dallas, Tex.

[21] Appl. No.: 388,659

[22] Filed: Aug. 2, 1989

[51] Int. Cl.[5] .............................................. G06F 7/38
[52] U.S. Cl. .................................. 364/748; 364/746.2
[58] Field of Search ................... 364/748, 746.2, 736, 364/715.04, 752

[56] References Cited

U.S. PATENT DOCUMENTS

| | | | |
|---|---|---|---|
| 3,928,857 | 12/1975 | Carter et al. | 340/172.5 |
| 4,475,173 | 10/1984 | Talmi | 364/715 |
| 4,528,640 | 7/1985 | Criswell | 364/737 |
| 4,586,154 | 4/1986 | Berry | 364/748 |
| 4,748,575 | 5/1988 | Ashkin et al. | 364/715 |
| 4,758,974 | 7/1988 | Fields et al. | 364/748 |
| 4,779,220 | 10/1988 | Nukiyama | 364/748 |
| 4,782,457 | 11/1988 | Cline | 364/715.04 |
| 4,785,421 | 11/1988 | Takahashi et al. | 364/715.04 |
| 4,794,557 | 12/1988 | Yoshida et al. | 364/748 |
| 4,878,190 | 10/1989 | Darley et al. | 364/752 |

Primary Examiner—Gary V. Harkcom
Assistant Examiner—Long T. Nguyen
Attorney, Agent, or Firm—Baker & Botts

[57] ABSTRACT

An arihemtic circuit (10) which comprises an adder/-rounder circuit (20) and a normalization estimation circuit (24) coupled in parallel to operand register (14, 19). A signed digit subtracter (25) subtracts the operands and inputs a signed digit difference to a pseudo-value converter (27). The pseudovalue converter (27) performs a three-bit overlapping scan of the signed digit differene to determine a bit location which corresponds to the approximate bit position of the most significant non-zero bit in the result of the arithmetic process performed in adder/rounder circuit (20). The pseudovalue converter (27) generates a pseudovalue in non-redundant format which contains its most significant non-zero bit in the selected bit position. The pseudovalue is output to a leading zero counter (28) which counts the number of leading zeroes in the pseudovalue. The number of leading zeroes is output to a barrel shifter (16) via an L-bus (30). The operands are simultaneously substracted in adder/rounder circuit (20) and the result is input into barrel shifter (16) via an M-bus (12). The result is then shifted in barrel shifter (16) according to the leading zero count input by leading zero counter (18). The shifted result is then input into a conditional shifter (18) which outputs the normalized result for subsequent rounding procedures and two's complement conversion.

45 Claims, 1 Drawing Sheet

CIRCUIT FOR SIMULTANEOUS ARITHMETIC CALCULATION AND NORMALIZATION ESTIMATION

TECHNICAL FIELD OF THE INVENTION

This invention relates in general to digital electronic circuits, and more particularly, to a method and apparatus for performing mathematical operations using a normalization estimation circuit.

BACKGROUND OF THE INVENTION

Traditionally, performing a floating point mathematical operation and normalizing the result is a slow and tedious process. After computational circuitry performs a floating point operation on two operands, the result must be normalized so as to contain a "one" in the most significant bit (MSB) of the mantissa. A leading zero counter (LZC) or one detector is often used to count the number of leading zeroes in the mantissa. The floating point result is normalized by shifting the mantissa the number of bits indicated by the LZC. The result must also be converted to a signed magnitude form and rounded to ensure sufficient accuracy and precision. Typically, the steps of converting and rounding require two separate passes through an adder circuit.

Both computation and normalization steps are time consuming. The computation step is delayed due to the carry propagation of data during the floating point operation. In prior art systems, the normalization process cannot begin until after the floating point operation is complete Current arithmetic systems are thus inherently slow since the computation and normalization steps must be performed sequentially.

Therefore, a need has arisen for an apparatus and method for increasing the speed of an arithmetic system by allowing normalization and computational functions to occur simultaneously.

SUMMARY OF THE INVENTION

In accordance with the present invention, an arithmetic circuit is provided which includes computation and normalization estimation circuitry. The normalization estimation circuitry has, as its inputs, the operands which are input into the computation circuitry. The normalization estimation circuitry does not require the result of the arithmetic operation as an input and may, therefore, operate in parallel with the computation circuitry to generate an approximation of the number of leading zeroes in the result which can then be input into a shifter concurrently with the result of the computation to approximately normalize the result.

According to one embodiment of the present invention, the normalization estimation circuitry comprises a signed digit subtracter, a pseudovalue converter and a leading zero counter. The signed digit subtracter subtracts the operands to yield a result in signed digit format. The pseudovalue converter then searches this result to locate the approximate bit position of the most significant nonzero bit in the result of an arithmetic operation occurring simultaneously in the computation circuitry. The pseudovalue converter locates this bit position by locating predetermined three bit groups which indicate the approximate position. The pseudovalue converter then generates a number in non-redundant format which has its most significant nonzero bit located in the selected position. The pseudovalue is then input into a leading zero counter which counts the number of leading zeroes in the pseudovalue and outputs the count to a shifter which appropriately shifts the result of the arithmetic operation. A conditional shifter is used to remove the indeterminacy in the normalization approximation. Circuitry is also provided to perform a two's complement conversion and rounding operation simultaneously.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF INVENTION

Figures 1, 2:
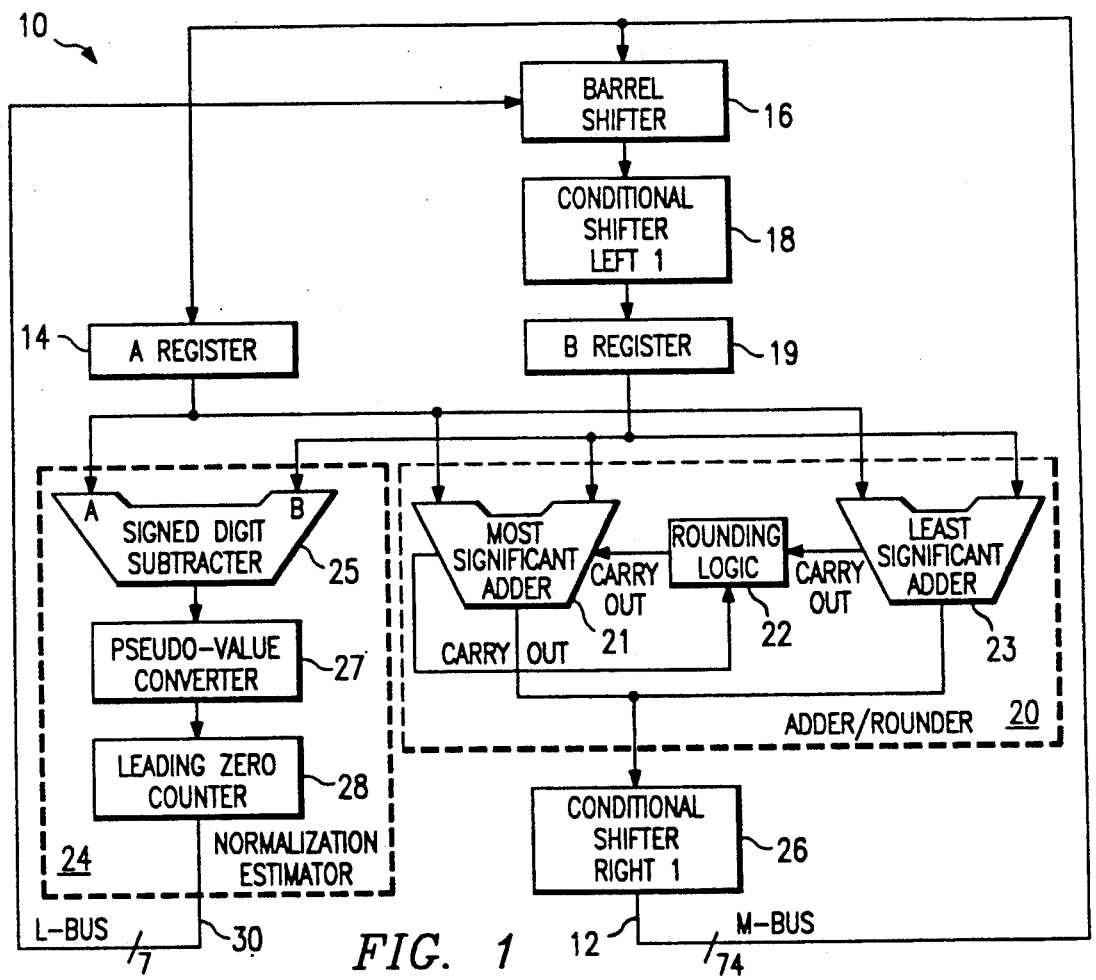
FIG. 1 illustrates, in block diagram form, various portions of exemplary arithmetic and normalization circuits which may advantageously utilize the teachings of the present invention.
FIG. 2 illustrates a table of 3-bit groups used by the present invention to identify the location of the most significant bit in the result of an arithmetic operation.

The preferred embodiment of the present invention is best understood by referring to FIGS. 1-2 of the drawings.

FIG. 1 illustrates a block diagram of an exemplary arithmetic circuit 10 using the normalization estimation circuit of the present invention. Circuit 10 illustrates a portion of a mantissa arithmetic logic unit which may reside in, for example, an arithmetic coprocessor or a microprocessor. A mantissa bus [M-bus] 12 is used by circuit 10 to communicate with other components (not shown) of an integrated arithmetic processing system. The M-bus 12 is coupled to an A-register 14 which is operable to store a mantissa of a first operand which may, for example, comprise a mantissa of a first floating point number. The M-bus 12 is also coupled to a barrel shifter 16 which is operable to shift numbers left and right by any desired number of bit positions.

The output of barrel shifter 16 is coupled to a conditional shifter 18. Conditional shifter 18 is operable to shift data one bit left depending on the state of the most significant bit of the number at its input. The output of conditional shifter 18 is coupled to a B-register 19 which is operable to store a second operand which may, for example, comprise a mantissa of a second floating point number. The output of B-register 19 is coupled to an adder/rounder circuit 20 and a normalization estimation circuit 24.

The adder/rounder circuit 20 of the preferred embodiment comprises a most significant adder 21, rounding logic 22 and a least significant adder 23. The least significant adder 23 is operable to add or subtract the least significant words of two floating point numbers and has a carry output coupled to the rounding logic 22 and an output coupled to the input of a conditional shifter 26. The rounding logic 22 is operable to round a floating point result and has a carry output coupled to the most significant adder 21. The most significant adder 21 is operable to add or subtract the most significant words of two floating point numbers and has a carry output coupled to the rounding logic 22 and an output coupled to the input of conditional shifter 26. Adders 21 and 23 each have two inputs which are coupled in parallel to the outputs of the A-register 14 and B-register 19, respectively.

Conditional shifter 26 is operable to normalize floating point numbers after rounding procedures. The output of conditional shifter 26 is coupled to barrel shifter 16 and A-register 14 via M-bus 12. The output of A-register 14 is also coupled to the normalization estimation circuitry 24 and adder/rounder circuit 20. The normalization estimation circuitry 24 produces an estimate of the number of leading zeroes in a result of a floating point operation performed in adder/rounder circuit 20. The output of the normalization estimation circuitry 24 is coupled to barrel shifter 16 via L-bus 30.

The normalization estimation circuitry 24 of the preferred embodiment comprises a signed digit subtracter 25 whose inputs are coupled to the outputs of the A-register 14 and B-register 19, respectively. The output of the signed digit subtracter 25 is coupled to the input of a pseudovalue converter 27 whose output is coupled to the input of a leading zero counter 28. The signed digit subtracter 25 receives the mantissas stored in the A-register 14 and B-register 19 as inputs, performs a signed digit subtraction and outputs a signed digit result to the pseudovalue converter 27. The pseudovalue converter 27 is operable to convert the redundant signed digit result to a non-redundant format, and outputs a pseudovalue to the leading zero counter 28. The pseudovalue comprises a number which has its most significant one in a bit position which is within one bit position of the actual bit position of the most significant one of the result of the operation performed in adder 22. The leading zero counter 28 outputs a value indicating the number of leading zeroes in the pseudovalue to the barrel shifter 16.

It should be understood that circuit 10 is a block diagram of a mantissa arithmetic logic unit and processes only the mantissa or fractional portion of floating point numbers. The mantissa arithmetic logic unit may exist in a floating point unit or in a microprocessor arithmetic logic unit. Exponents are processed in an exponent arithmetic logic unit (not shown). The barrel shifter 16, the conditional shifter 18 and the conditional shifter 26 all have data paths (not shown) to the exponent arithmetic logic unit as the shifting operations performed by these elements affect the value of the exponents associated with the result of the arithmetic operation.

In operation of circuit 10, A-register 14 and B-register 19 each receive the mantissas of floating point operands via M-bus 12. The operand loaded into B-register 19 is loaded by passing it unchanged through barrel shifter 16 and conditional shifter 18. Through the operation of normalization estimator circuitry 24, circuit 10 performs an arithmetic operation on the two operands and simultaneously estimates the number of leading zeroes in the result of the arithmetic operation. The normalization estimation circuitry 24 performs this estimation process. In the embodiment shown in FIG. 1, normalization estimation circuitry comprises the signed digit subtracter 25, the pseudovalue converter 27 and the leading zero counter 28. However, normalization estimation circuitry 24 may comprise other embodiments comprising different elements to perform the same function.

The signed digit subtracter 25 performs a signed digit subtraction on the operands, and outputs a result in signed digit format. The pseudovalue converter 27 converts the signed digit result into a pseudovalue in non-redundant format having a number of leading zeroes identical to or one less than that of the true floating point result. The leading zero counter 28 counts the number of leading zeroes in the pseudovalue. This number is output to the barrel shifter 16 via L-bus 30. M-bus 12 is 74 bits wide to provide a more than sufficient number of bits in the data path to conform to the IEEE standard for extended precision. L-bus 30 is seven bits wide. The width of the L-bus 30 and the M-bus 12 are dependent on the precision of the embodiment shown in FIG. 1 and should not be construed to limit the scope of the present invention which is applicable to a variety of embodiments having different capabilities with regard to the precision of the operands and the result.

The operands stored in A-register 14 and B-register 19 are presented to adder/rounder circuit 20 for subtraction simultaneously with their presentation to the normalization estimator 24. It is important to note that one operand need not be in a normalized format. For example, the operand stored in B-register 19 may be shifted into a non-normalized format to allow for the exponents of the two operands to be equal. Adder/rounder circuit 20 then may perform, for example, the subtraction of the mantissas stored in registers 14 and 19. The result of this arithmetic operation may not be in a normalized format and is presented to the barrel shifter 16 through M-bus 12. The result is passed unchanged at this point through conditional shifter 26 and is used during subsequent rounding operations. The result output by adder/rounder circuit 20 may be in either two's complement format or signed magnitude format depending on the relative magnitudes of the operands.

The barrel shifter 16 receives the non-normalized floating point result off the M-bus 12 and the value generated by the normalization estimation circuitry indicating the number of leading zeroes in the pseudovalue off the L-bus 30. The barrel shifter 16 then shifts the result the indicated number of bit positions left to approximately normalize the result. Since the value generated by the normalization estimation circuitry may be one less than the actual value necessary to normalize the result, an additional shift of one bit position may or may not be necessary. The conditional shifter 18 shifts the result one place if the result output by the barrel shifter 16 is not already in a normalized form. This is done by testing the most significant bit in the result output by the barrel shifter 16. The barrel shifter 16, conditional shifter 18 and conditional shifter 26 are all coupled to the exponent arithmetic logic unit to increment or decrement the exponent depending on whether the mantissa was shifted left or right.

In prior art methods, the output of computational circuitry, such as adder/rounder circuit 20, could be in two's complement format if the operands are both in normalized form. In this case, according to prior art methods, an additional pass through an adder circuit is required to convert the result to a format which facilitates a count of the leading zeroes of the result. According to the present invention, the number of leading zeroes is estimated whether the result output by adder/rounder circuit 20 is in two's complement or signed magnitude format. A result in two's complement format may be shifted by the count output by normalization estimator 24 and then passed through adder/rounder circuit 20 to allow for conversion from two's complement format to signed magnitude format and rounding operations in a single pass through adder/rounder circuit 20

After the arithmetic result is normalized, the result may be rounded to conform to the appropriate IEEE standard rounding procedures. The four rounding procedures include rounding to the nearest place, rounding up, rounding down and chopping towards zero. Rounding operations require a second pass through adder/rounder circuit 20 because for example, when rounding to the nearest place, one-half unit is added in the least significant place, or when rounding up one full unit is added in the least significant place and the result is truncated. In both of these cases, from the addition process, there may be a carry out from the most significant bit of the result. This carry out bit may create a non-normalized result. Therefore, conditional shifter 26 shifts the non-normalized result one place to the right to renormalize the result, if necessary, after the rounding operation. The exponent is then appropriately adjusted in the exponent arithmetic logic unit.

An important technical advantage of the adder/rounder circuit 20 is that it is capable of doing a two's complement conversion and a rounding operation simultaneously. This is implemented by rounding logic 22 comprising carry propagation logic which drives the least significant bit of the most significant adder 21. If the result is already in signed magnitude format then rounding is dictated by the guard, round, and indicator bits per IEEE standard 754, however if the result is in two's complement format the IEEE standard is implemented as described herein below.

Rounding operations and two's complement conversion are similar in that they both involve the addition of a 1 to a selected bit position. In two's complement conversion, the bit position is the least significant bit of the least significant adder 23 while rounding operations affect the least significant bit of the most significant adder. 21. If the unrounded result is in two's complement format, then before rounding the operand must be complemented and a logic one added to the least significant bit of the least significant adder 23. The information to then correctly round is available in the guard bit, which comprises the most significant bit of the least significant adder 23, and the carry into the guard bit. Therefore to do simultaneous rounding and two's complement conversion all necessary information is located in the guard bit, the carry into the guard bit and the least significant bit of the most significant adder 21. Below is a truth table which describes conditions where the carry into the least significant bit of the most significant adder 21 is forced to a one. If the conditions of the truth table are not met then the carry into the least significant bit of the most significant adder 21 is simply the carry out of the guard bit, the result of which provides a correctly rounded signed magnitude result.

| ROUNDING MODE | LSB | GUARD | CARRY INTO GUARD |
|---|---|---|---|
| NEAREST | X | 1 | X |
| NEAREST | 1 | 0 | 1 |
| (−) INFINITY | X | X | X |

The above truth table may be implemented in rounding logic 22 to perform rounding operations on the result if the result is in two's complement form.

The result of the subtraction operation performed in the cycle prior to rounding indicates whether the result is in two's complement format by a logic level zero on the carry out of the most significant adder 21. This information is stored in a data latch in the rounding logic 22 and is then used on the subsequent round cycle to invert the data operand and add one to least significant bit the least significant adder 23.

The operation of the pseudovalue converter 27 of one embodiment of the present invention involves logic which examines the result output by the signed digit subtracter 25 for the location of particular 3 bit groups. Referring to FIG. 2, various states are shown for three sequential signed bits. The table shown in FIG. 2 is used by the pseudovalue converter to convert the signed digit subtraction result, which is in signed digit format, to the pseudovalue input into the leading zero counter 28. By doing a three-bit overlap scan of each bit in the signed digit subtraction result, the bit position of the most significant nonzero bit can be determined within one bit position. The criterion establishing the most significant bit is summarized in tabular form in FIG. 2.

The pseudovalue converter 27 searches the result output by the signed digit subtracter 25 for the three bit groups shown in FIG. 2. The pseudovalue converter 27 uses a three bit overlap scan of each bit in the signed digit subtraction result. The pseudovalue converter 27 then generates a pseudovalue which is in non-redundant format and which has its most significant nonzero bit in the same bit position as the center bit in the three bit pattern located using the aforementioned three bit overlap scan. This pseudovalue is then output to the leading zero counter 28 which counts the number of leading zeroes in the pseudovalue and outputs that number to the barrel shifter 16 via L-bus 30. As discussed previously, the number of leading zeroes in the pseudovalue will always be exactly the same or one less than the number of leading zeroes in the result of the arithmetic operation performed in adder/rounder circuit 20.

The parallel operation of the computational and normalization estimation circuitry allows for saving of multiple clock cycles. In prior art systems, leading zero count circuitry is placed in series with the adder or computational circuitry. Thus, the time period for an arithmetic floating point operation was equal to the time required for the arithmetic operation plus the time required for normalization and rounding operations. An important technical advantage of the present invention is that the parallel orientation of the computation and normalization circuitry allow for the computation process and normalization approximation process to occur simultaneously. The number of leading zeroes in the floating point result is estimated simultaneously with, rather than after, the arithmetic operation. There is no need for a carry propagation path in the normalization estimation circuitry which allows for the quick and efficient generation of the pseudovalue. This allows for the total calculation time to determine the leading zero count to be comparable to the calculation time of the result itself. The normalization estimation circuitry has, as its inputs, the operands themselves and, therefore, is totally independent of the computational circuitry and can be run in parallel, allowing the saving of multiple clock cycles.

Although the present invention has been described in detail, it should be understood that various changes, substitutions and alterations can be made herein without departing from the spirit and scope of the invention as defined by the appended claims.

What is claimed is:

1. A circuit for performing arithmetic operations on first and second operands, comprising:

first and second memory registers for storing said first and second operands respectively;

computation circuitry coupled to said memory registers for performing an arithmetic operation on said first and second operands; and a normalization estimation circuit coupled in parallel with said computation circuitry to said memory registers and operable to generate an estimation of the number of leading zeroes in a result of said arithmetic operation, in response to said first and second operands, said normalization estimation circuit comprising:

a pseudo-value converter generating in response to said operands a pseudo-value having a number of leading zeroes which is either exactly equal to or equal to one less than the number of leading zeroes in said result; and a leading zero counter having an input coupled to an output of said converter and operable to count the number of leading zeroes in said pseudo-value.

2. The circuit of claim 1 and further comprising:
a shifter coupled to said computation circuitry such that said shifter is operable to receive a result of said arithmetic operation and coupled to said normalization estimation circuitry such that said shifter is operable to receive said estimation and shifts said result a number of bit positions equal to said estimation.

3. The circuit of claim 2 wherein said shifter comprises a barrel shifter operable to shift said result a number of bit positions equal to said estimation.

4. The circuit of claim 2 and further comprising a conditional shifter coupled to said shifter and operable to receive said shifted result and shift said shifted result if said shifted result is not normalized to yield a normalized result.

5. The circuit of claim 4 and further comprising circuitry for performing rounding operations on said normalized result.

6. The circuit of claim 4 and further comprising circuitry for simultaneously performing rounding operations and two's complement conversion operations on said normalized result.

7. The circuit of claim 2 and further comprising circuitry for coupling said shifter to an exponent arithmetic logic unit, said exponent arithmetic logic unit operable to conditionally increase or decrease an exponent associated with said result responsive to said shifter.

8. The circuit of claim 1 wherein said normalization estimation circuit further comprises:
a signed digit subtractor having inputs coupled to said memory registers and operable to receive said first and second operands and subtract said operands to yield a difference, said subtracter having an output coupled to an input of said pseudo-value converter.

9. The circuit of claim 1 wherein said arithmetic operation comprises subtraction.

10. The circuit of claim 1 and further comprising circuitry for selectively denormalizing one of said operands prior to said arithmetic operation such that exponents associated with said operands are equal.

11. A circuit for performing arithmetic operations on first and second operands, comprising:
a computation circuit for performing an arithmetic operation on the first and second operands and having two inputs and an output;

first and second operand registers each coupled to a different input of said adder circuit; and a normalization estimation circuit having an output, said normalization circuit operating in parallel with said computation circuit and operable to generate an estimation of the number of leading zeroes in a result of said arithmetic operation, said normalization estimation circuit comprising a signed digit subtracter having a first input coupled to said first operand register, a second input coupled to said second operand register, and an output, said subtracter operable to subtract aid first operand from said second operand to yield a difference operable to yield said estimation.

12. The circuit of claim 11 and further comprising:
a shifter having an output, a first input coupled to said output of said computation circuit and a second input coupled to said output of said normalization estimation circuit, said shifter operable to shift said result a number of bit positions equal to said estimation in order to approximately normalize said result.

13. The circuit of claim 12 wherein said shifter comprises a barrel shifter operable to shift said result a number of bit positions equal to said estimation.

14. The circuit of claim 12 and further comprising a conditional shifter operable to shift said result if said result is not normalized to generate a normalized result, said conditional shifter having an input coupled to said output of said shifter and an output.

15. The circuit of claim 12 and further comprising circuitry for coupling said shifter to an exponent arithmetic logic unit, said exponent arithmetic logic unit operable to conditionally increase or decrease an exponent associated with said result responsive to said shifter.

16. The circuit of claim 11 wherein said normalization estimation circuit further comprises a pseudovalue converter circuit having an input coupled to said output of said signed digit subtracter and an output, said pseudovalue converter operable to convert said difference into a non-signed pseudovalue having a number of leading zeroes which is either exactly equal to the number of leading zeroes in said result of said arithmetic operation or which is equal to one less than the number of zeroes in said result of said arithmetic operation.

17. The circuit of claim 14 wherein said normalization estimation circuit further comprises a leading zero counter circuit having an output and an input coupled to said output of said pseudovalue converter circuit, said leading zero counter operable to count the number of leading zeroes in said pseudovalue and generate said estimation.

18. A circuit for performing arithmetic operations on first and second operands, comprising:
first and second operand registers for storing said operands;

circuitry coupled to said registers for computing from the operands a non-normalized result of an arithmetic operation;

circuitry coupled to said registers for yielding an estimate of the number of leading zeroes in said non-normalized result simultaneously with said arithmetic operation, said circuitry for yielding an estimate comprising a pseudovalue generator operable to generate from said operands a pseudovalue having a number of leading zeroes within one of the number of leading zeroes in said non-normalized result, said pseudovalue operable to yield said estimate; and circuitry for normalizing said non-normalized result using said estimate of the number of leading zeroes to produce a normalized result of said arithmetic operation.

19. The circuit of claim 18 wherein said pseudovalue generator comprises:

subtraction circuitry for performing a signed digit subtraction on the operands to yield a signed digit difference; and conversion circuitry coupled to said subtraction circuitry for converting said signed digit difference to a pseudovalue in non-redundant format having a number of leading zeroes within one of the number of leading zeroes in the result of said arithmetic operation; and counting circuitry coupled to said conversion circuitry for counting the number of leading zeroes in the pseudovalue to yield an estimation of the number of zeroes in the result of the arithmetic operation.

20. The circuit of claim 19 wherein said circuitry for converting comprises circuitry for performing a three-bit overlapped scan on each bit of said signed digit difference.

21. The circuit of claim 18 wherein said circuitry for normalizing comprises circuitry for shifting said result of said arithmetic operation a number of bit positions equal to said estimate to yield an intermediate result.

22. The circuit of claim 21 wherein said circuitry for normalizing further comprises circuitry for conditionally shifting said intermediate result a single bit position responsive to the state of the most significant bit in said intermediate result to yield a normalized result.

23. The circuit of claim 21 and further comprising circuitry for performing rounding operations on said normalized result.

24. The circuit of claim 23 wherein circuitry for performing rounding operations comprises circuitry for converting said normalized result from two's complement format to signed digit format simultaneously with said rounding operations.

25. The circuit of claim 18 wherein the arithmetic operation comprises subtraction.

26. The circuit of claim 18 and further comprising circuitry, coupled to at least one of said first and second operand registers, for denormalizing one of the operands prior to performing the arithmetic operation such that exponents associated with the operands are equal.

27. A circuit for performing arithmetic operations on two operands, comprising:

an adder for performing an arithmetic operation on the two operands having first and second inputs and an output;

a first operand register coupled to said first input of said adder;

a second operand register coupled to said second input of said adder;

a normalization estimation circuit having a first input coupled to said first operand register, a second input coupled to said second operand register, said normalization estimation circuit also having an output, said normalization estimation circuit operating in parallel with said adder and operable to generate an estimation of the number of leading zeroes in a result of said arithmetic operation, said normalization estimation circuit comprising:

a signed digit subtracter and a pseudovalue converter, said subtracter having a first input coupled to said first operand register, a second input coupled to said second operand register and an output, said subtracter operable to subtract said first operand from said second operand to yield a difference; and a pseudovalue converter having an input coupled to said output of said signed digit subtracter and an output, said pseudovalue converter operable to convert said difference into a non-redundant pseudovalue having a number of leading zeroes within one of the number of leading zeroes in said result of said arithmetic operation, said non-redundant pseudovalue operable to yield said estimation; and a shifter having an output, a first input coupled to said output of said adder and a second input coupled to said output of said normalization estimation circuit, said shifter operable to shift said result a number of bit positions equal to said estimation.

28. The circuit of claim 27 wherein said shifter comprises a barrel shifter operable to shift said result a number of bit positions equal to said estimation.

29. The circuit of claim 27 and further comprising a conditional shifter operable to shift said result to generate a normalized result if said result is not normalized, said conditional shifter having an input coupled to said output of said shifter and an output.

30. The circuit of claim 27 and further comprising circuitry for coupling said shifter to an exponent arithmetic logic unit, said exponent arithmetic logic unit operable to conditionally increase or decrease an exponent associated with said result responsive to said shifter.

31. The circuit of claim 30 wherein the arithmetic operation comprises subtraction.

32. The circuit of claim 30 and further comprising circuitry, coupled to at least one of said first and second operand registers, for denormalizing one of the operands prior to performing the arithmetic operation such that exponents associated with the operands are equal.

33. The circuit of claim 27 wherein said normalization estimation circuit further comprises a leading zero counter circuit having an output and an input coupled to said output of said pseudovalue converter, said leading zero counter operable to count the number of leading zeroes in said non-redundant pseudovalue and output said estimation.

34. The circuit of claim 27 and further comprising circuitry for performing rounding operations and circuitry for converting said normalized result from two's complement format to signed digit format simultaneously with said rounding operations.

35. A method of performing an arithmetic operation on two floating point operands, comprising the steps of:

storing the operands in first and second operand registers;

computing from the operands a non-normalized result of an arithmetic operation;

estimating the number of leading zeroes in the non-normalized result simultaneously with said step of computing by performing a signed digit subtraction on the operands to yield a difference using a signed digit subtraction circuit, the difference operable to yield an estimate of the number of leading zeroes; and normalizing the non-normalized result using the estimate of the number of leading zeroes to produce a normalized result of the arithmetic operation.

36. The method of claim 35 wherein said step of estimating the number of leading zeroes comprises the steps of:
   converting the signed digit difference to a pseudovalue using a plural bit overlap scan of each bit in the difference in order to identify the location of the most significant non-zero bit of said result, the pseudovalue having a number of leading zeroes within one of the number of leading zeroes in the non-normalized result of the arithmetic operation; and
   counting the number of leading zeroes in the pseudovalue to yield an estimation of the number of zeroes in the result of the arithmetic operation.

37. The method of claim 36 wherein said step of converting comprises the step of performing a three-bit overlapped scan on each bit of the signed digit difference.

38. The method of claim 35 wherein said step of normalizing comprises the step of shifting the result of the arithmetic operation a number of bit positions equal to the estimation to yield an intermediate result.

39. The method of claim 38 wherein said step of normalizing further comprises the step of conditionally shifting the intermediate result a single bit position responsive to the state of the most significant bit in the intermediate result to yield a normalized result.

40. The method of claim 35 and further comprising the step of performing rounding operations on the normalized result.

41. The method of claim 40 and further comprising the steps of converting the normalized result from two's complement format to signed digit format simultaneously with said step of performing rounding operations.

42. The method of claim 35 wherein the arithmetic operation comprises subtraction.

43. The method of claim 35 wherein one of the operands is denormalized prior to performing the arithmetic operation such that exponents associated with the operands are equal.

44. A circuit for performing arithmetic operations on first and second operands, comprising:
   a first memory register for storing the first operand;
   a second memory register for storing the second operand;
   computation circuitry for performing and arithmetic operation on the first and second operands, said computation circuitry having a first input coupled to said first memory register, a second input coupled to said second memory register, and an output;
   a normalization estimation circuit coupled in parallel with said computation circuitry and operable to generate an estimation of the number of leading zeroes in a result of said arithmetic operation, said normalization estimation circuit comprising:
      a signed digit subtracter circuit having a first input coupled to said first memory register, a second input coupled to said second memory register and an output, said subtracter circuit operable to subtract said first operand from said second operand to yield a difference;
      a pseudovalue converter circuit having an input coupled to said output of said subtracter circuit and an output, said converter circuit operable to generate a pseudovalue having a number of leading zeroes within one of the number of leading zeroes in said result of said arithmetic operation, said converter circuit operable to generate said pseudovalue responsive to said difference; and
      a leading zero counter circuit having an input coupled to said output of said pseudovalue converter and an output, said leading zero counter circuit operable to generate said estimation by counting the number of leading zeroes in said pseudovalue; and
   a shifter circuit having a first input coupled to said output of said leading zero counter circuit, and a second input coupled to said output of said computation circuitry, said shifter circuit operable to shift said result a number of places equal to said estimation in order to approximately normalize said result.

45. The circuit of claim 44 wherein said pseudovalue converter circuit comprises circuitry for performing a plural bit overlapped scan of said difference to yield said pseudovalue.

* * * * *

UNITED STATES PATENT AND TRADEMARK OFFICE
CERTIFICATE OF CORRECTION

PATENT NO. : 5,040,138

DATED : August 13, 1991

INVENTOR(S) : Robert D. Maher, III

It is certified that error appears in the above-identified patent and that said Letters Patent is hereby corrected as shown below:

Column 1, line 32, between "complete" and "Current", insert a period (.).

Column 4, line 68 (last line), after "20" insert a period (.).

Column 5, line 26, after "754" change the comma to a semicolon;

Column 5, line 26, after "however, insert a comma;

Column 5, line 35, between "adder" and "21" delete the period (.);

Column 5, line 41, after "Therefore" insert a comma;

Column 5, lines 42-43, between "conversion" and "all", insert a comma;

Column 5, line 63, change "form." to --format.--.

Column 6, line 2, between "to" and "least" insert --the--;

Column 6, line 3, between "bit" and "the", insert --in--;

Column 6, line 46, change "allow" to --allows--.

Column 7, line 13 (Claim 1, line 15), change "pseudo-value" to --pseudovalue--.

Column 7, line 14 (Claim 1, line 16), change "pseudo-value" to --pseudovalue--;

UNITED STATES PATENT AND TRADEMARK OFFICE
CERTIFICATE OF CORRECTION

PATENT NO. : 5,040,138

DATED : August 13, 1991

INVENTOR(S) : Robert D. Maher, III

It is certified that error appears in the above-identified patent and that said Letters Patent is hereby corrected as shown below:

Column 7, line 21 (Claim 1, line 23), change "pseudo-value" to
--pseudovalue--;

Column 7, line 57 (Claim 8, line 7), change "pseudo-value" to
--pseudovalue--.

Column 8, line 12 (Claim 11, line 17), change "aid" to
--said--;

Column 8, line 47 (Claim 17, line 1), change "claim 14" to
--claim 16--.

Signed and Sealed this

Twenty-seventh Day of April, 1993

*Attest:*

MICHAEL K. KIRK

*Attesting Officer*  *Acting Commissioner of Patents and Trademarks*